Patented July 5, 1938

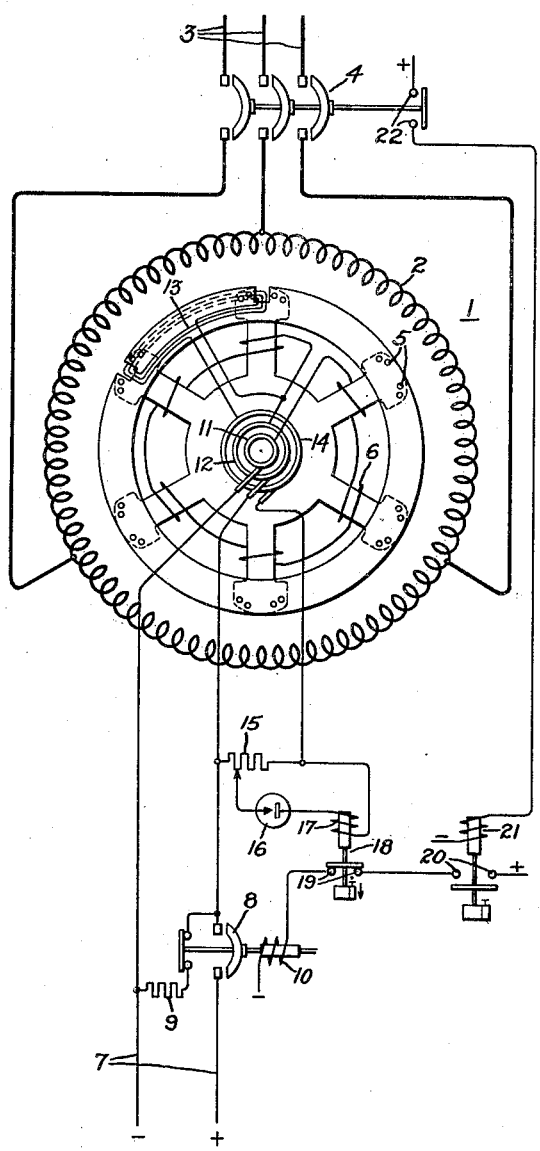

2,123,066

UNITED STATES PATENT OFFICE 2,123,066

CONTROL SYSTEM

David R. Shoults, Schenectady, N. Y., assignor to General Electric Company, a corporation of New York Application August 20, 1937, Serial No. 160,089

8 Claims. (Cl. 172—289)

My invention relates to control systems and particularly to a system for controlling the application of excitation to the field winding of a synchronous machine when the speed of the machine increases above a predetermined value, and one object of my invention is to provide an improved synchronous motor field control system for effecting the application of the field excitation at a selected optimum angular relation between the rotating armature flux and the field structure of the machine.

In the Seeley patent, 1,958,250, granted May 8, 1934, and assigned to the assignee of the present application, there is disclosed and claimed an arrangement including a half wave rectifier and a time relay connected in series across a portion of the discharge resistor of a synchronous motor for effecting the closing of the motor field switch when the frequency of the slip frequency current induced in the main field winding of the motor, while it is operating below synchronous speed, decreases below a predetermined value. As is well known in the art, this time relay starts to operate at substantially the instant when the induced slip frequency current in the main field winding is zero, which is the best time to apply excitation to the field winding. However, due to the time it takes the time relay to complete its circuit closing operation and for the field switch to close, the field winding of the motor does not become excited with direct current until sometime after the rotor of the machine has passed its best synchronizing position. One object of my present invention is to provide an improved arrangement of connecting the slip frequency responsive arrangement disclosed in the aforesaid Seeley patent so that it will effect the application of excitation to the motor field winding at the instant when the rotor of the motor is in its best synchronizing position.

In accordance with my invention, I provide on the field structure of the synchronous machine an auxiliary single phase winding which is displaced a predetermined amount relatively to the axis of the main field winding so that the slip frequency voltages respectively induced in the two windings differ in phase when the machine is operating subsynchronously, and which supplies slip frequency current to the slip frequency responsive arrangement of the type disclosed in the aforesaid Seeley patent.

My invention will be bettter understood from the following description, when taken in connection with the accompanying drawing, the single figure of which diagrammatically illustrates a synchronous motor controlled system embodying my invention, and the scope of my invention will be pointed out in the appended claims.

Referring to the drawing, I represents a synchronous motor having an armature winding 2 which is arranged to be connected to a suitable polyphase supply circuit 3 by means of a switch 4 which may be of any suitable type, examples of which are well known in the art. While I have shown a manually controlled switch 4, it is obvious that any suitable automatic means may be employed for controlling the opening and closing of this switch. The motor I is also provided with a short-circuited squirrel-cage winding 5 and a main field winding 6 which is arranged to be connected to a suitable source of excitation 7 by means of a field switch 8. This switch 8, when open, is arranged to connect a discharge resistor 9 across the terminals of the field winding 6. The switch 8 is provided with an operating winding 10 which, when energized, moves the switch 8 from the position in which it is shown to its other position in which the source of excitation 7 is connected to the field winding 6.

As shown in the drawing, the armature winding 2 is on the stationary member of the motor I, and the main field winding 6 is on the rotating member so that the connections between the source of excitation 7 and the field winding 6 include the slip rings 11 and 12.

For controlling the energization of the operating member 10 of the field winding 6 so that the field winding is excited with direct current at the proper time to produce the best synchronizing operation, I mount on the rotating member of the motor an auxiliary single phase winding 13 in such a manner that it is displaced relatively to the axis of the main field winding 6. Consequently, the slip frequency voltage induced in this auxiliary field winding 13 is out of phase with the voltage induced in the main field winding 6. One terminal of this auxiliary field winding 13 is connected to the slip ring 12, and the other terminal is connected to a third slip ring 14. Connected across the slip rings 12 and 14 is a control circuit including a resistor 15. A half wave rectifier 16 and a winding 17 of a time delay drop-out relay 18 are connected in series across a portion of the resistor 15.

The contacts 19 of the relay 18, which are closed when the relay is in its deenergized position, are connected in the energizing circuit for the closing coil 10 of the field switch 8.

In order to prevent the field switch 8 from being closed, when the switch 4 is open, the circuit of the closing coil 10 of the field switch 8 also includes the contacts 20 of a time relay 21 which is arranged to be energized to close its contacts 20 after the switch 4 has been closed a predetermined time. As shown in the drawing, this result is accomplished by providing the circuit of the winding of relay 21 with the contacts 22 which are arranged to be closed by the switch 4 when it is in its closed position.

The operation of the arrangement shown in the drawing is as follows:

When it is desired to start the motor, the switch 4 is closed so that the voltage of the supply circuit 3 is applied to the motor armature winding 2 to start the motor 1 and accelerate it to approximately synchronous speed. As soon as the motor armature winding 2 is energized, a voltage of slip frequency is induced in the main field winding 6 and also in the auxiliary winding 13. The voltage of slip frequency induced in the auxiliary winding 13 causes a current of slip frequency to flow through this winding and the resistor 15. Also a portion of this slip frequency current flows through the half-wave rectifier 16 and the winding 17 of the relay 18 during one of the half cycles of the slip frequency current.

The magnitude and frequency of the slip frequency current, through the operating winding 17 of the relay 18, are such that the relay picks up immediately after the switch 4 is closed and maintains its contacts 19 open until the motor reaches substantially synchronous speed. A predetermined time after the switch 4 is closed to start the motor 1, the relay 21 closes its contacts 20 in the circuit of the closing coil 10 of the field switch 8, but this circuit is not completed at this time as the relay 18 has opened its contacts 19. The relay 21 is normally adjusted so that it does not close its contacts 20 until sufficient time has elapsed for the relay 18 to open its contacts 19.

When the motor reaches the speed at which it is desired to synchronize, the half cycle of induced current, during which the winding 17 of the relay 18 is deenergized, is long enough to allow the relay to drop out at the end of the half cycle and close its contacts 19, thereby completing through the contacts 20 of the relay 21 the energizing circuit of the closing coil 10 of the field switch 8. The field switch 8 then closes to connect the field winding 6 to the source of excitation 7.

Since the relay 18 closes its contacts 19 at a definite point in the cycle of induced current of slip frequency through the auxiliary winding 13 and the operating time of the field switch 8 is a definite value, it is evident that by properly locating the auxiliary winding 13 on the field structure of the motor, the relay 18 can be made to drop out at such a point that excitation is applied at the best angular position of the field winding 6 and the rotating armature flux for synchronizing. With the particular slip frequency responsive arrangement disclosed in the drawing, the auxiliary winding 13 should be displaced on the field structure of the motor approximately 90 electrical degrees in the direction opposite to the direction of rotation of the rotor so that the induced current in the auxiliary winding 13 leads the induced current in the main field winding 6. With such an arrangement, the relay 18 drops out and starts the closing operation of the field switch 8 so that it completes its closing operation, and the connection of the main field winding to the source of excitation at the proper angular position of the field winding and the rotating armature flux to produce the maximum pull-in torque.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, a polyphase supply circuit, a synchronous machine having an armature winding connected to said supply circuit, a field winding for said machine, a source of excitation, means for connecting said source of excitation to said field winding, an auxiliary winding on said machine so located relatively to said field winding that a slip frequency voltage is induced in said auxiliary winding when said machine is operating subsynchronously and differs a predetermined amount in phase from the slip frequency voltage induced in said field winding, a closed circuit for said auxiliary winding, and means controlled by the slip frequency current in said auxiliary winding for initiating the operation of said connecting means at a predetermined point in the cycle of slip frequency current in said closed circuit when the frequency of said last mentioned slip frequency current is a predetermined value.

2. In combination, a polyphase supply circuit, a synchronous machine having an armature winding connected to said supply circuit, a field winding for said machine, a source of excitation, means for connecting said source of excitation to said field winding, an auxiliary winding on said machine so located relatively to said field winding that a slip frequency voltage is induced in said auxiliary winding when said machine is operating subsynchronously and differs a predetermined amount in phase from the slip frequency voltage induced in said field winding, a closed circuit for said auxiliary winding, a resistor in said closed circuit, a shunt circuit around a portion of said resistor including a half wave rectifier and a relay connected in series, means for delaying the operation of said relay to its deenergized position for a predetermined time when said relay is deenergized, and means responsive to the movement of said relay to its deenergized position for effecting the operation of said connecting means.

3. In combination, a polyphase supply circuit, a synchronous machine having an armature winding connected to said supply circuit, a field winding for said machine, a source of excitation, means for connecting said source of excitation to said field winding, an auxiliary winding on said machine so located relatively to said field winding that a slip frequency voltage is induced in said auxiliary winding when said machine is operating subsynchronously which leads the slip frequency voltage induced in said field winding a predetermined amount, a closed circuit for said auxiliary winding, and means controlled by the slip frequency current in said auxiliary winding for initiating the operation of said connecting means at substantially the end of a predetermined half cycle of slip frequency current in said closed circuit when the frequency of said last mentioned slip frequency current is a predetermined value.

4. In combination, a polyphase supply circuit, a synchronous machine having an armature winding connected to said supply circuit, a field winding for said machine, a source of excitation, means for connecting said source of excitation to said field winding, an auxiliary winding on said machine so located relatively to said field winding that a slip frequency voltage is induced in said auxiliary winding when said machine is operating subsynchronously and leads the slip frequency voltage induced in said field winding a predetermined amount, a closed circuit for said auxiliary winding, a resistor in said closed circuit, a shunt circuit around a portion of said resistor including a half wave rectifier and a time delayed drop out relay connected in series, and means responsive to the dropping out of said relay for effecting the operation of said connecting means.

5. In combination, a polyphase supply circuit, a synchronous machine having an armature winding connected to said supply circuit, a field winding for said machine, a source of excitation, means for connecting said source of excitation to said field winding, an auxiliary winding on the field structure of said machine, and means controlled by the slip frequency current induced in said auxiliary winding for initiating the operation of said connecting means at a predetermined point in the cycle of slip frequency current in said auxiliary winding when the frequency of said current is a predetermined value.

6. In combination, a polyphase supply circuit, a synchronous machine having an armature winding connected to said supply circuit, a field winding for said machine, a source of excitation, means for connecting said source of excitation to said field winding, an auxiliary winding on said machine displaced substantially 90 electrical degrees in space from the axis of one of the field poles of the machine, and means controlled by the slip frequency current induced in said auxiliary winding for initiating the operation of said connecting means at a predetermined point in the cycle of slip frequency current in said auxiliary winding when the frequency of said current is a predetermined value.

7. In combination, a polyphase supply circuit, a synchronous machine having an armature winding connected to said supply circuit, a field winding for said machine, a source of excitation, means for connecting said source of excitation to said field winding, a control circuit, means controlled by the current in said control circuit for initiating the operation of said connecting means at a predetermined point in a cycle of alternating current in said control circuit when the frequency of said current is a predetermined value, and an auxiliary winding on said machine for supplying slip frequency current to said control circuit and so displaced relatively to the field winding that the slip frequency voltage induced in said auxiliary winding differs in phase relatively to the slip frequency voltage induced in said field winding by an amount sufficient to effect the application of excitation to said field winding at a selected optimum angular position of the motor field winding relatively to the rotating armature flux.

8. In combination, a polyphase supply circuit, a synchronous machine having an armature winding connected to said supply circuit, a field winding for said machine, a source of excitation, means for connecting said source of excitation to said field winding, a control circuit, a resistor in said circuit, a shunt circuit around a portion of said resistor including a half wave rectifier and a time delayed drop out relay connected in series, means responsive to the dropping out of said relay for effecting the operation of said connecting means, and an auxiliary winding on said machine for supplying slip frequency current to said control circuit and so displaced relatively to said field winding that the slip frequency voltage induced in said auxiliary winding leads the slip frequency voltage induced in said field winding by an amount sufficient to effect the operation of said time relay at the proper time to cause excitation to be applied to said field winding at a selected optimum angular position of the motor field winding relatively to the rotating armature flux.

DAVID R. SHOULTS.